INVENTORS
BRUCE WILLIAM LINDSTRÖM
NILS EMIL NILSSON
BY Hane and Nydick
ATTORNEYS INVENTORS
BRUCE WILLIAM LINDSTRÖM
NILS EMIL NILSSON
BY Hane and Nydick
ATTORNEYS United States Patent Office 3,083,306

Patented Mar. 26, 1963

3,083,306

MONO-STABLE SWITCH AND SELF-ACTING STEPPING CHAIN USING SUCH SWITCH

Bruce William Lindström and Nils Emil Nilsson, Stockholm, Sweden, assignors to Telefonaktiebolaget L M Ericsson, Stockholm, Sweden, a corporation of Sweden Filed Nov. 10, 1959, Ser. No. 852,126
Claims priority, application Sweden Nov. 24, 1958
4 Claims. (Cl. 307—88.5)

The present invention refers to a mono-stable switch that is especially suitable for self-acting stepping chains and chains built up of such switches.

The known mono-stable switches normally include two amplifier elements (electron tubes, transistors) where the outlet from one of the amplifier elements is fed back to the inlet of the second amplifier element and conversely. One of these feedbacks is a direct current feedback while the other contains a connection capacitance, which causes it to be active only at current changes. With the common type of mono-stable multivibrators the direct current feedback is carried out by means of a resistance, common to the outlet circuits of the two amplifier elements (cathode connected mono-stable switch), the outlet of one of the amplifier elements being connected to the inlet of the other amplifier element through a connecting condenser. The advantage of this connection is that the inlet of the first amplifier element and the outlet of the second amplifier element are accessible respectively for applying a governing signal and taking out the generated impulse, without any influence of the signal source impedance nor of the load impedance upon the functioning of the switching circuit.

It has been tried to connect such switching circuits in series in order to obtain a self-acting stepping chain that is usable as a call finder or a queue turn selector in automatic telephone systems. A start impulse on the first switch inlet should automatically progress from stage to stage by arranging that the first stage when restoring from the mono-stable position starts the following stage. It has been found, however, that the connecting condensers between the outlet of the one amplifier element and the inlet of the other conduct a revertive impulse which makes impossible a predetermined stepping.

A switch according to the invention is very suitable for use in self-acting stepping chains because there is no risk of obtaining revertive impulses. Furthermore it is very easy to stop the chain in a desired position simply by locking the switch in question in operated position by means of an external potential.

A mono-stable switch according to the invention includes two amplifier elements. A feedback between the amplifier elements is obtained partly by an impedance common to the outlet currents of the two elements and partly by a feedback from the outlet of the first element to the inlet of the second, and where control impulses are applied to the inlet of the first amplifier element. The load impedance of the second amplifier element consists of a resistance connected in parallel with a capacitance, whereby the resistance is of such a value that the current flowing through the second amplifier element in the conductive condition after the condenser has been charged, is insufficient to maintain the first amplifier element in a blocked condition.

The invention will be further described in connection with the attached drawings, where FIG. 1 shows a switch circuit according to the invention.

Figure 1:
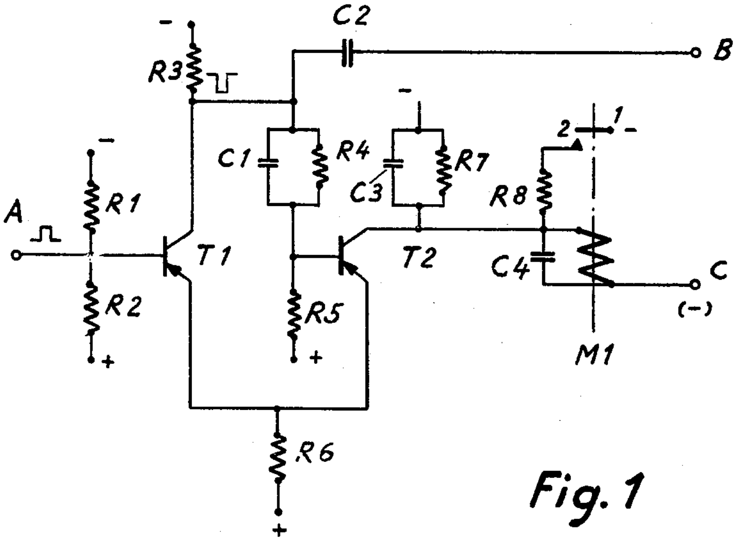

In the switch circuit shown in FIG. 1 the amplifier elements include two transistors $T_1$ and $T_2$. The emitters of the transistors are interconnected and also connected to the positive (+) of a battery through the resistance $R_6$. The base of the transistor $T_1$ is connected to a terminal of a voltage divider $R_1$, $R_2$ connected between the negative and positive pole of the battery and to an inlet A for the governing signals. The collector of the transistor $T_1$ is connected through a resistance $R_3$ to negative and through the condenser $C_2$ to an outlet B. The collector is furthermore connected to the base of the transistor $T_2$ through a parallel circuit consisting of a resistance $R_4$ and a condenser $C_1$. This base is also connected to positive through a resistance $R_5$. The collector of the transistor $T_2$ is connected to negative through the parallel circuit $C_3$, $R_7$ and to the terminal C through the relay winding $M_1$, connected in parallel with the condenser $C_4$, and furthermore through a resistance $R_8$ to the contact 2 on the relay $M_1$.

The switch circuit functions as follows: The transistor $T_1$ is normally conducting, whereby current is flowing from positive through the resistance $R_6$, through the emitter and collector of the transistor $T_1$ and through the resistance $R_3$ to negative, the current rising to such a value that the emitter obtains a potential somewhat higher than that of the base connected to the voltage divider $R_1$, $R_2$. The resistance $R_3$ is selected in such a way, that the collector potential of the transistor $T_1$ is sufficient to obtain this current. The voltage divider $R_4$, $R_5$, connected between the collector of the transistor $T_1$ and positive, is so dimensioned that the voltage loss across the resistance $R_5$ is less than the voltage loss across the resistance $R_6$, whereby the base potential and the transistor $T_2$ is held blocked.

If a positive impulse is fed to the inlet A, the transistor $T_1$ is blocked, whereby its collector potential is rapidly changing to negative while the emitter potential changes to positive. As the parallel circuit $C_1$, $R_4$ has a low impedance to rapid changes, the base of the transistor $T_2$ will have a low potential in the first moment after the blocking of the transistor $T_1$, and the transistor $T_2$ is made conducting. The parallel circuit $C_3$, $R_7$ forms at the first moment a very low impedance for the rapidly increasing collector currents of the transistor $T_2$, while the emitter currents through the resistance $R_6$ reduce the potential of the emitter of the transistor $T_1$ to such an extent, that the latter is effectively blocked even if the control impulse ceases.

During the time the condensers $C_1$ and $C_3$ are charged the base current and collector current of the transistor $T_2$ are decreasing. The base potential approaches a final value that is controlled by the voltage divider formed by the resistances $R_3$, $R_4$ and $R_5$, while the collector current aproaches a value controlled by the collector resistance $R_7$. The resistance $R_7$ is of such a value, that the voltage loss across the resistance $R_6$ caused by the emitter current is not sufficient to keep the transistor $T_1$ blocked, said transistor starting to conduct. Simultaneously with the increase of current through the transistor $T_1$ the collector potential of the same is increased and, the condenser $C_1$ being charged, the base of the transistor $T_2$ will receive a positive impulse that blocks the transistor $T_2$. This course of events is occurring cumulatively, and the switch circuit will rapidly return to the original condition, prevailing before the control impulse was applied at the inlet A. At the outlet B a negative impulse is obtained, the leading edge of which is created when the transistor $T_1$ is strangled, while its trailing edge appears when $T_1$ again is made conductive.

If the terminal C is connected to negative, when the working cycle of the switch circuit begins, the collector current through the transistor $T_2$ will pass the impedance formed by the condenser $C_4$ and the parallelly connected relay coil $M_1$. The condenser $C_4$ has such a capacitance that the collector current is sustained at a sufficient value to keep the transistor $T_1$ blocked until the relay current is built up. The current that, after the transient phenomena have ceased, passes the emitter-collector circuit of the transistor $T_2$ is conducted mainly through the relay coil $M_1$, the resistance of which is selected in such a way, that the voltage loss, caused by the emitter-collector current across the resistance $R_6$, keeps the transistor $T_1$ safely blocked. The relay $M_1$ operates, whereby the collector of the transistor $T_2$ is connected to negative potential through the resistance $R_8$ and the contacts 1—2 of the relay.

When negative potential is disconnected from the terminal C, the condenser $C_4$ is discharged through the relay coil $M_1$ and the relay is restored. Through the resistance $R_8$ a current is maintained by the transistor $T_2$ at such a value, that the transistor $T_1$ is kept blocked until the relay $M_1$ is restored. When the contacts 1—2 open, the transistor $T_2$ is blocked while the transistor $T_1$ is made conductive, so that the switch circuit is restored to inactive position as described above. As mentioned in the preamble the switch circuit of the invention is particularly suited for use in self-acting stepping chains of the kind often used in automatic telephone systems for finders, queue turn selections and similar uses.

Figure 2:
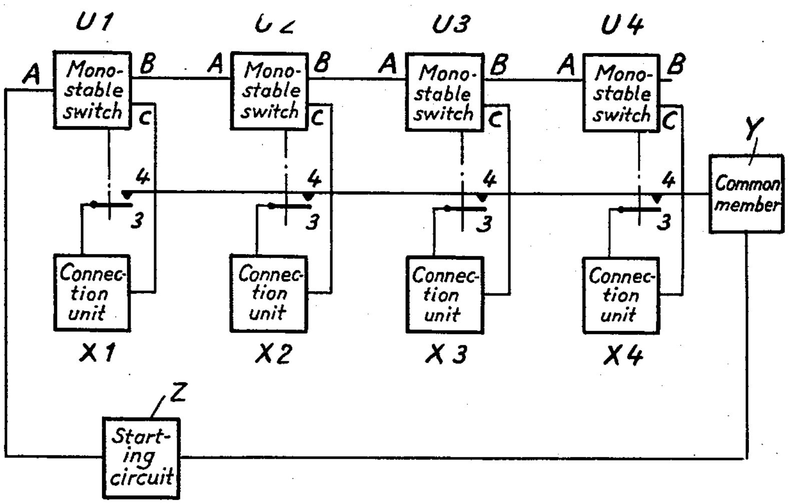
FIG. 2 shows a chain built up by switch circuits according to FIG. 1.

FIGURE 2 shows a chain, where one connection unit—and only one—$X_1$, $X_2$, $X_3$ or $X_4$, is to be connected to a common member Y. For this purpose a chain of switches $U_1$–$U_4$ is used in which one unit is assigned to each switch circuit. In the drawing the switch circuits are shown schematically, the terminals A, B, C all having the same designations as in the FIGURE 1. The outlet B of the switch $U_1$ is connected to the signal inlet A of the following switch $U_2$ etc. The terminal C of each switch is connected to the corresponding unit ($X_1$–$X_4$) and when the unit in question is free for connecting to the member Y, the terminal C is given a negative potential.

The finding of a free unit is started by the starting circuit Z sending out a positive impulse to the inlet A of the first switch $U_1$. Provided the terminal C is not marked by negative potential, the switch $U_1$ will complete a swinging cycle and at the trailing edge of the negative impulse, obtained at the outlet B, the switch $U_2$ is started and so on. In this manner the units $X_1$–$X_4$ are tested in a given sequence until a free unit is found, whereby the switch will remain in operated position as described above, and whereby the relay $M_1$ is operated. This closes the contacts 3—4, thereby connecting the corresponding unit, for instance $X_3$, to the common member Y. When the unit $X_3$ has been served by the member Y, the negative potential is disconnected from the terminal C, whereby the relay $M_1$ of the switch $U_3$ releases and the positive impulse is passed from the outlet B to the inlet A of the next switch $U_4$. These impulses are repeated by the switches one by one until the next unit marked by negative potential on terminal C is found.

Figure 3:
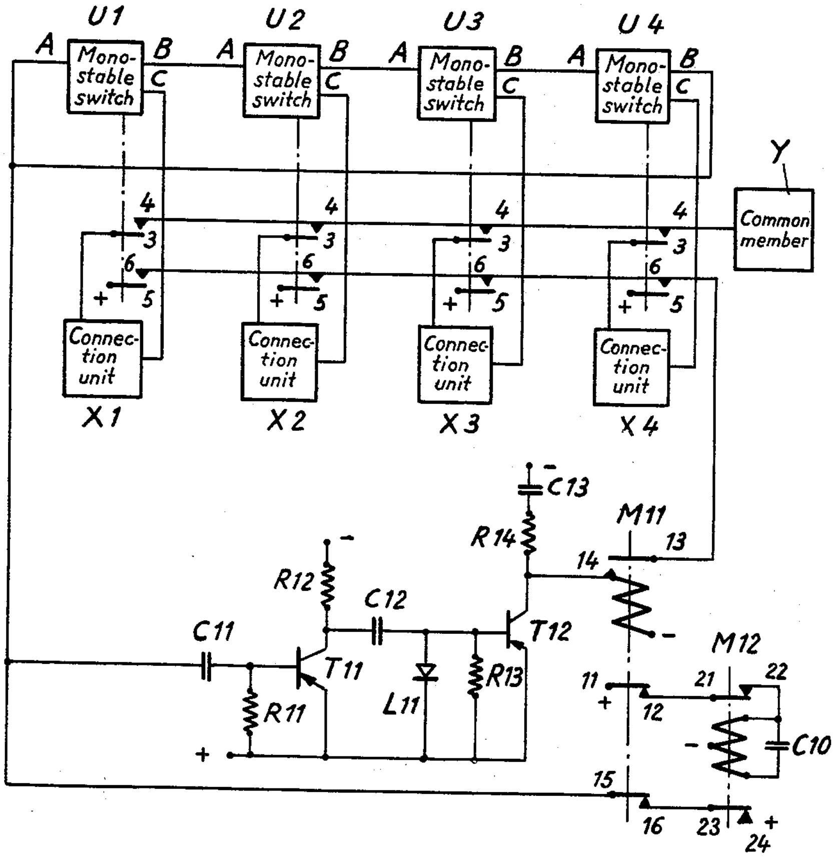
FIG. 3 shows an endless chain built up by switch circuits according to FIG. 1.

In FIGURE 3 a continuously stepping, endless chain is shown consisting of switches $U_1$–$U_4$ according to FIGURE 1, which are connected in the same manner as in FIGURE 2 with the exception that the outlet B of the switch $U_4$ is connected back to inlet A of the switch $U_1$. The chain is, as well as that of FIGURE 2, intended for connecting marked units $X_1$–$X_4$ to a member Y and calls from these units are signalled by connecting a negative potential to the terminal C of the corresponding switch $U_1$–$U_4$. To the chain according to FIGURE 3 corresponds a circuit consisting of two transistors $T_{11}$ and $T_{12}$ and two relays $M_{11}$ and $M_{12}$ for supervision of the continuous stepping of the chain. The inlet to the supervision circuit, connected to the base circuit of transistor $T_{11}$, is also connected to the feed-back circuit between switches $U_1$ and $U_4$ and to positive through the contacts 15, 16 of the relay $M_{11}$ and the break contacts 23, 24 of the relay $M_{12}$. The collector of the transistor $T_{12}$ is through a make contact 13, 14 of the relay $M_{11}$ connected to the parallelly connected make contacts 5—6 of the switch relay $M_1$.

When the chain is connected to the battery, a positive voltage difference is transmitted through the contacts 15, 16 and 23, 24 to the inlet of the first switch of the chain. The relay $M_{12}$ is operated with a delay, controlled by the condenser $C_{10}$, in a circuit from positive potential through the contact 11, 12 and 21, 22 to negative, and upon operation of the relay the positive potential is disconnected from the inlet A, whereby the chain stepping is started, and from the relay itself, which releases, with a delay controlled by the condenser $C_{10}$. The delay is of long duration compared with the stepping cycle of the chain.

Each time the chain has been stepped one cycle, a negative impulse is obtained at the base of the transistor $T_{11}$, and the transistor is made conductive during the time of the impulse, whereby the collector rises to approximately the positive potential of the battery. The condenser $C_{12}$, that at rest is charged to full battery voltage, is discharged through the rectifier $L_{11}$ in order to retain the positive battery potential at the right electrode of the condenser. When the impulse ceases and the transistor $T_{11}$ is strangled, the condenser $C_{12}$ is again charged. The rectifier thus being blocked, the charging is mainly carried out through the emitter-base circuit of the transistor $T_{12}$, whereby also the emitter-collector circuit is made conducting and passes a current impulse until the condenser $C_{12}$ is charged. The collector current is distributed between the relay coil $M_{11}$ and the series circuit of the resistance $L_{14}$ and the condenser $C_{13}$, and after a number of collector current impulses the condenser $C_{13}$ is charged to such an extent that the relay $M_{11}$ operates. The condenser $C_{13}$ has a capacitance of such a value that the relay is kept operated, even if one or a few collector current impulses would fail. If several collector current impulses on the contrary would fail, the condenser $C_{13}$ is discharged through the resistance $R_{14}$ and the coil of relay $M_{11}$ to such an extent, that the relay releases.

When the relay $M_{11}$ operates, the contacts 11—12 and 15—16 break, whereby the positive potential is disconnected from the relay $M_{12}$ and from the impulse inlet of the switch $U_1$. Furthermore, the relay $M_{11}$ is connected through the contact 13—14 to the parallelly connected contacts 5—6 of the relays $M_1$ in the switches $U_1$–$U_4$. As soon as any one of the switches $U_1$–$U_4$ stops in operated position, a positive potential is consequently connected to the relay $M_{11}$, which remains in operative condition in spite of ceasing of the stepping. When the corresponding unit $X_1$–$X_4$ again is released, the stepping of the chain is continued.

If on the contrary the impulses from the terminal C of the last switch $U_4$ due to any reason would fail to appear, the relay $M_{11}$ releases with a certain delay as described above, whereby the positive potential is again connected to the inlet A of the switch $U_1$ and the automatic stepping is again started.

Due to the feature that the chain is continuously stepping through its stages and always starts from the stage, where it has stopped, the connection of the units $X_1$–$X_4$ to the member Y will occur completely by chance and the search after calling respectively disengaged unit will occur without preference to any special unit.

We claim:

1. A pulse controlled mono-stable switch unit comprising a first normally conducting amplifying means and a second normally non-conducting amplifying means, feedback circuit means interconnecting said amplifying means, said feedback circuit means including a positive potential source and a feeding impedance means for feeding said positive potential thereto common to said first and second amplifying means and a circuit connection between the output of said first amplifying means and the input of said second amplifying means, the control pulses being fed to the input of said first amplifying means, a first load impedance means including a capacitance means connected to said second amplifying means, a second load impedance means, a source of potential for temporarily connecting said second load impedance means in parallel with said first load impedance means, said first load impedance means having an impedance value such that, upon application of a control pulse, said first amplifying means becomes initially non-conducting and said second amplifying means conducting and then upon the capacitance means in said first load impedance means being charged, the first amplifying means becomes again conducting and the second amplifying means non-conducting, and said second load impedance means having an impedance value such that upon connection of said second load impedance means in parallel with the first load impedance means the current flowing through said feeding impedance means when and while the second amplifying means is conducting, is sufficient to maintain the first amplifying means non-conducting.

2. A switch circuit according to claim 1 wherein said second load impedance means comprise a network including a relay coil and a second capacitance means connected in parallel with each other, said network being connected to said second amplifying means to maintain the first amplifying means non-conducting until the relay coil is substantially energized, and wherein said relay coil controls switch contacts, said switch contacts being actuated in response to said relay coil being substantially energized.

3. A switch circuit according to claim 1 wherein each of said amplifying means comprises a transistor.

4. A stepping relay system comprising a plurality of mono-stable switch circuits as defined in claim 2, an outlet of each of said switch circuits being connected to an inlet of another switch circuit to form a chain of said switch circuits, a source of potential selectively connectable to each one of said switch circuits to free a selected switch circuit for actuation of the relay switch contacts in response to the feeding of a control pulse to the stepping relay system, and a conductor common to all said switch circuit systems, said relay switch contacts, when actuated, connecting the respective switch circuit system to said common conductor, a control pulse applied to the switch circuit system first in said chain actuating sequentially successive switch circuit systems until a switch circuit system is reached connected to said source of potential.

References Cited in the file of this patent

UNITED STATES PATENTS

| | | |
|---|---|---|
| 2,536,808 | Higinbotham | Jan. 2, 1951 |
| 2,778,978 | Drew | Jan. 22, 1957 |

FOREIGN PATENTS

| | | |
|---|---|---|
| 143,722 | Australia | Oct. 9, 1951 |